Oct. 5, 1948.　　　　　C. F. FOLEY　　　　　2,450,544
BAG COUPLING
Filed Nov. 27, 1945　　　　　　　　　　　　2 Sheets-Sheet 1
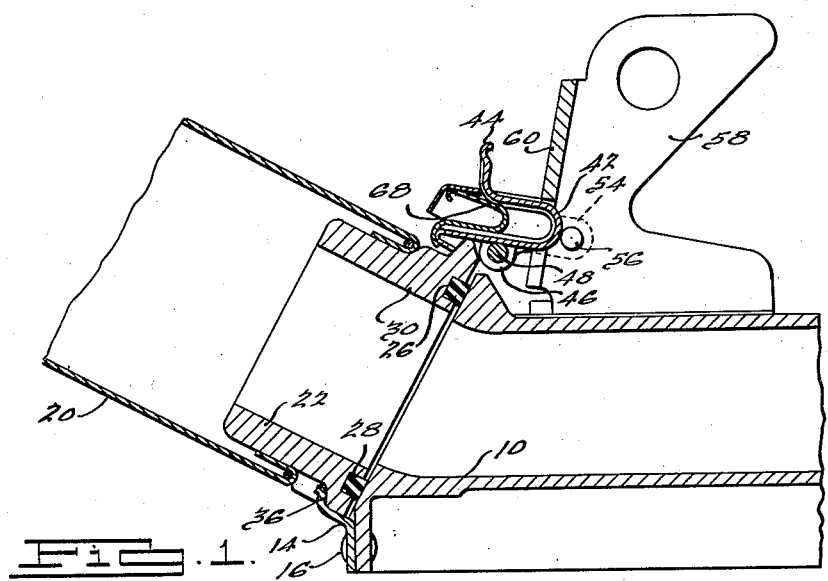
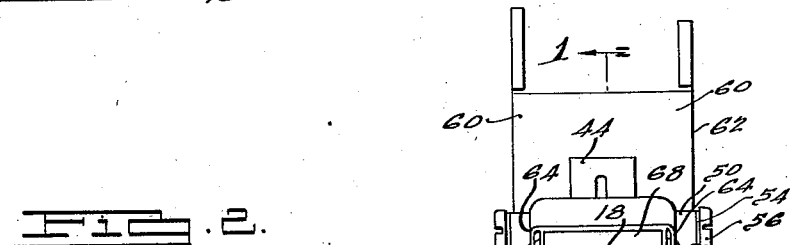
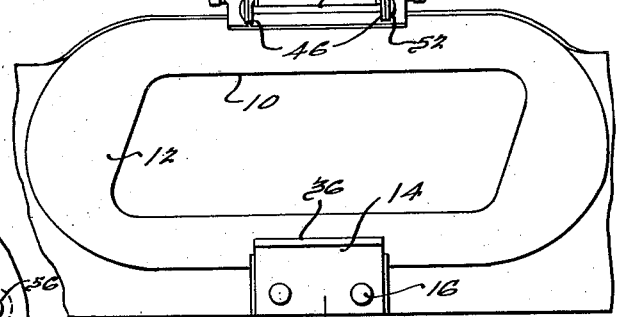
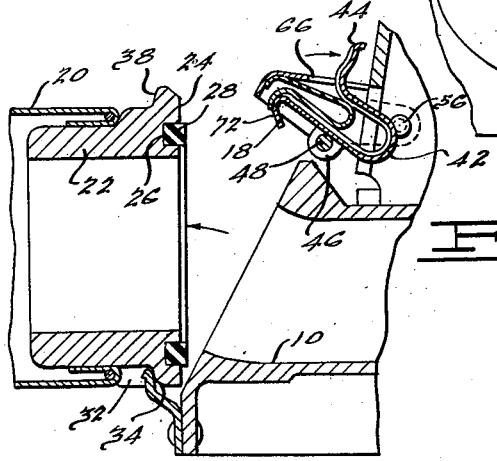
INVENTOR.
Charles F. Foley.
BY
E. J. Balluff
ATTORNEY Oct. 5, 1948.  C. F. FOLEY  2,450,544
BAG COUPLING Filed Nov. 27, 1945  2 Sheets-Sheet 2

INVENTOR.
Charles F. Foley.
BY
E. J. Balluff
ATTORNEY.

Patented Oct. 5, 1948

2,450,544

UNITED STATES PATENT OFFICE 2,450,544

BAG COUPLING

Charles F. Foley, Bloomington, Ill., assignor to Eureka Williams Corporation, a corporation of Michigan Application November 27, 1945, Serial No. 631,051

6 Claims. (Cl. 285—173)

1

This invention relates to bag couplings which are particularly adapted for connecting bags of suction cleaners to the discharge outlet thereof.

Principal objects of the invention are to provide:

A new and improved bag coupling for suction cleaners;

A bag coupling for suction cleaners which is simple in construction and efficient in operation.

Other objects and advantages of the invention will be apparent from the following specification taken in conjunction with the accompanying drawings, of which there are two sheets and wherein:

Fig. 1 is a vertical sectional view of a bag coupling embodying the invention and taken generally along the line I—I of Fig. 2;

Fig. 2 is an elevational view of the coupling parts associated with the discharge opening of the cleaner;

Fig. 3 is a view similar to Fig. 1 but showing the parts of the coupling partially disassembled;

Figure 4:
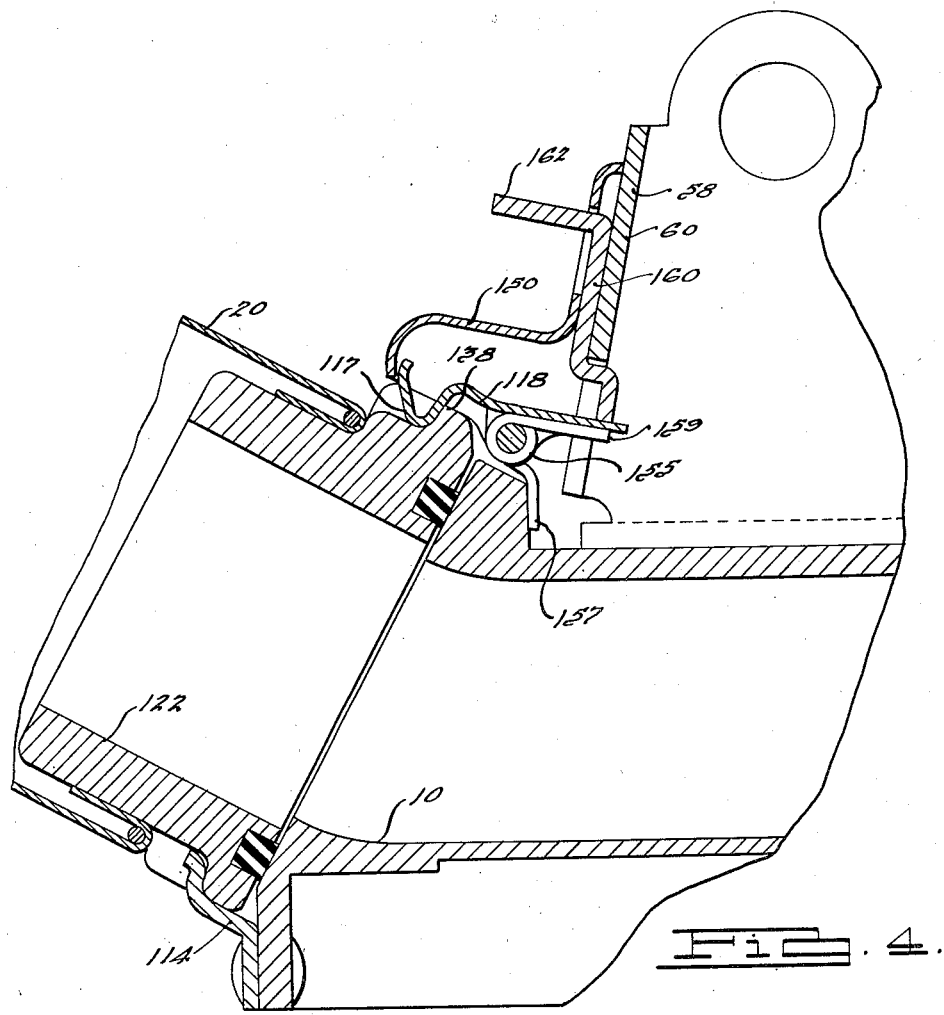
Fig. 4 is a view similar to Fig. 1 but illustrating a modified form of the invention.

Referring now to Figs. 1 to 3, the discharge outlet 10 of a suction cleaner terminates in a sloping face 12 which faces rearwardly and upwardly. The discharge opening 10 and face 12 define a coupling member to which the dust-collecting bag of a suction cleaner is adapted to be connected. This coupling member has associated therewith a fixed coupling element 14 comprising a clip which is secured by means of rivets 16 to the face 12 of the coupling member. This coupling member also is provided with a spring pressed coupling member 18 in the form of a latch. The bag 20 has secured thereto a coupling member 22 in the form of a sleeve, such coupling member defining an inlet to the bag. Coupling member 22 is provided with a flat face 24 in which a continuous channel or groove 26 is provided, the groove 26 extending completely around the passageway 30 through the coupling member 22 and having a gasket or sealing member 28 arranged therein. With the coupling member 22 arranged as illustrated in Fig. 1, the gasket 28 is adapted to fit against the face 12 on the cleaner coupling member and provide a sealed joint between the outlet 10 from the cleaner and the inlet 30 to the bag provided by the interior of the sleeve 22. The gasket 28 is formed of a suitable resilient material and is made of such size

2 so that when the coupling members are secured together as illustrated in Fig. 1, the gasket 28 will be compressed a certain extent.

The sleeve 22 is provided with an external seat or recess 32 defining a shoulder 34 which is adapted to be engaged or located by the free end of the element 14 thereby to aid in positioning the face 24 of the coupling member 22 relative to the face 12 around the discharge outlet 10. The latch 18 is constructed and arranged to engage a shoulder 38 provided on the upper end of the bag coupling member 22 as illustrated in Fig. 1 so as to cooperate with the element 14 and shoulder 34 to position the coupling member 22 relative to the outlet 10. The opening 30 through the coupling member 22 conforms to the opening 10 in the cleaner body. The recess 32 cooperates with the free end 36 of the element 14 to align the coupling member 22 relative to the outlet 10.

The latch 18 is formed on one end of a U-shaped pivoted member 42, the other end 44 thereof being exposed and forming a release so that pressure may be applied to the member 42 for rocking the same about its pivot in order to separate the latch 18 from the shoulder 38. The member 42 is provided with a pair of down turn lugs 46, such lugs being apertured. A pin 48 extending through the apertures in the lugs 46 and through aligned openings in a bracket 50 forms a pivotal mounting for the U-shaped member 42. The ends of the pin 48 may be headed as indicated at 52 so as to retain the latch member 42 in assembled relationship with the bracket 50.

The bracket 50 includes a pair of forwardly extending ears 54 which are secured by means of rivets or screws 56 to the handle bracket 58 of the cleaner. The bracket 50 seats against the rear wall 60 of the handle bracket 58 while the ears 54 straddle the sides 62 thereof. The bracket 50 projects rearwardly from the rear walls 60 of the handle bracket and includes sides 64 which straddle the U-shaped member 42 and the lugs 46 thereof. The bracket 50 is also provided with an opening 66 in the upper wall thereof through which the end 44 of the pivoted latch member 42 projects. A leaf spring 68 is confined between the top wall of the bracket 50 and one of the legs of the U-shaped member 42 as illustrated in Figs. 1 and 3 and functions to bias the latch 18 into the position as illustrated in Fig. 1.

However, the latch member 42 may be pivoted in a clockwise direction from the position in which it is illustrated in Fig. 1 by exerting pressure on the end 44 in the direction of the handle bracket 58 or the arrow shown adjacent the end 44 in Fig. 3, thereby to cause the latch member 42 to rock about its pivot and separate the latch 18 from the shoulder 38. Thereafter the shoulder 34 which seats between the free end 36 of the coupling element 14 and the face 12 may be rocked in a counterclockwise direction so as to move the shoulder 38 away from the latch 18 as illustrated in Fig. 3, after which the shoulder 34 may be separated from the element 14 by lifting the coupling element 22 vertically.

The release end 44 of the latch element 42 is exposed so that pressure may be applied thereto by means of a thumb or finger for breaking the coupling. However, when the pressure is released from the end 44, the spring 68 will reposition the latch 18 in the position as illustrated in Fig. 1. The latch 18 is formed so that its rearward face 72 slopes in a direction so that when the coupling member 22 is to be secured to the outlet 10, the coupling member 22 may be rocked in a clockwise direction from the position in which it is illustrated in Fig. 3 to engage the latch 18 and displace it so that the coupling member 22 may be positioned as shown in Fig. 1 after which the spring 68 will position the latch to engage the shoulder 38.

Figure 5:
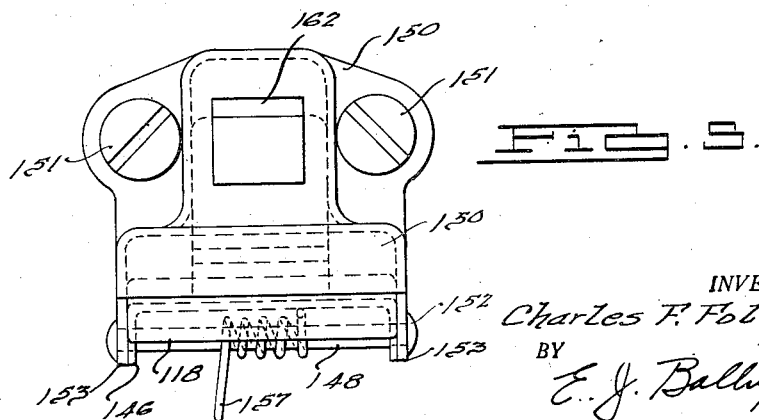
Fig. 5 is an elevational view of parts of the coupling associated with the discharge opening of the cleaner.

In Figs. 4 and 5, a modification is illustrated. The coupling member 122 and the coupling element 114 as shown in Figs. 4 and 5 are substantially the same as those illustrated in the previous modification. A bracket 150 is secured to the rear wall of the handle bracket 58 by means of screws 151. The bracket 150 has downwardly extending ears 153 which are provided with aligned openings through which a pin 148 extends, the ends of the pin being headed as shown at 152. The pin 148 extends through aligned openings in lugs 146 provided on a latch element 118, the element 118 being positioned between the side walls of the bracket 150 and pivotally mounted on the pin 148. A coil spring 155 is coiled around the pin 148 and has one end 157 abutting a shoulder on the cleaner and another end 159 reacting on the latch element 118 so as to bias the same in a counterclockwise direction in order to position the latch 117 in position to engage the shoulder 38 on the bag coupling member 138. A release member 160 is slidably positioned by and between the bracket 150 and the rear wall 60 of the handle bracket 58. One end of the release member 160 is positioned to engage one end of the latch member 118 while the other end 162 is exposed so that pressure may be applied to the release member 160 in a downward direction to pivot the latch member 118 in a clockwise direction about its pivot in order to shift the latch 117 out of engagement with the shoulder 138 thereby to release the coupling member 122.

The construction and operation of the modified form of the invention is otherwise the same as that of Figs 1 to 3.

While I have illustrated and described preferred embodiments of my invention, it is understood that these are capable of modification and I therefore do not wish to be limited to the precise details set forth, but desire to avail myself of such changes and alterations as fall within the purview of the following claims.

I claim:

1. In a bag coupling for a suction cleaner in which the cleaner is provided with an outlet and a face surrounding the outlet, a hollow coupling member having a gasket around the opening therethrough and which gasket is arranged to be seated on said face, said cleaner having a clip positioned below said outlet and a pivoted latch member having a sloping forward face positioned above said outlet, said coupling member having a seat arranged for cooperation with said clip, said clip being cooperable with said seat for locating one side of said coupling member relative to said outlet whereby said coupling member is rockable on said clip, said coupling member having a shoulder aligned with said forward face and arranged to be engaged and held by said pivoted latch when said coupling member is rocked on said clip to position said gasket in sealing relationship with said face, and a release by means of which pressure may be applied to said pivoted latch for disengaging the same from said shoulder.

2. A bag coupling as defined in claim 1 wherein said release comprises an integral exposed portion of said pivoted latch member.

3. In a bag coupling for a suction cleaner in which the cleaner is provided with an outlet, a hollow coupling member arranged to be seated on said cleaner with the interior of said coupling member aligned with said outlet, said cleaner having a clip positioned below said outlet and a pivoted latch member having a sloping forward face positioned above said outlet, said coupling member having a seat arranged for cooperation with said clip, said clip being cooperable with said seat for locating one side of said coupling member relative to said outlet whereby said coupling member is rockable on said clip, said coupling member having a shoulder aligned with said forward face and arranged to be engaged and held by said pivoted latch when said coupling member is rocked on said clip so as to secure said coupling member to said outlet, and a release by means of which pressure may be applied to said pivoted latch for disengaging the same from said shoulder.

4. In a bag coupling for a suction cleaner in which the cleaner is provided with an outlet and a face surrounding the outlet, a hollow coupling member arranged to be seated on said face with the interior of said coupling member aligned with said outlet, said cleaner having a locating means positioned at one side of said outlet and a pivoted latch member positioned on the other side of said outlet, said coupling member having a seat arranged for cooperation with said locating means for locating one side of said coupling member relative to said outlet, said coupling member being rockable on said locating means, said coupling member having a shoulder aligned with said pivoted latch and arranged to be engaged and held by said pivoted latch when said coupling member is rocked on said locating means so as to position said coupling member in sealing relationship with said face, and a release by means of which pressure may be applied to said pivoted latch for disengaging the same from said shoulder.

5. In a bag coupling for a suction cleaner in which the cleaner is provided with an outlet, a face surrounding the outlet and a handle bracket above said outlet, a hollow coupling member having a gasket around the opening therethrough and which gasket is arranged to be seated on said face, said cleaner having a locating means positioned below said outlet and a pivoted latch member positioned above said outlet, said coupling member having a seat arranged for cooperation with said locating means, said locating means being cooperable with said seat for locating one side of said coupling member relative to said outlet, said coupling member being rockable on said locating means, said coupling member having a shoulder arranged to be engaged and held by said pivoted latch when said coupling member is rocked on said clip so as to position said gasket in sealing relationship with said face, a release by means of which pressure may be applied to said pivoted latch for disengaging the same from said shoulder, bracket means provided on said handle bracket and forming a pivotal support for said latch member, and a spring reacting on said latch member and biasing the same into shoulder engaging position.

6. A bag coupling as defined in claim 5 wherein said latch member is provided with a surface arranged to be engaged by said shoulder upon the aforesaid rocking movement of said coupling member so as to deflect said latch member to permit said coupling member to be arranged in sealing relationship with said face without the necessity of actuating said release.

CHARLES F. FOLEY.

REFERENCES CITED

The following references are of record in the file of this patent:

UNITED STATES PATENTS

| Number | Name | Date |
|---|---|---|
| 198,402 | Marsden | Dec. 18, 1877 |
| 758,956 | Buzzel | May 3, 1904 |
| 1,857,528 | Cantell | May 10, 1932 |